Figure 1:
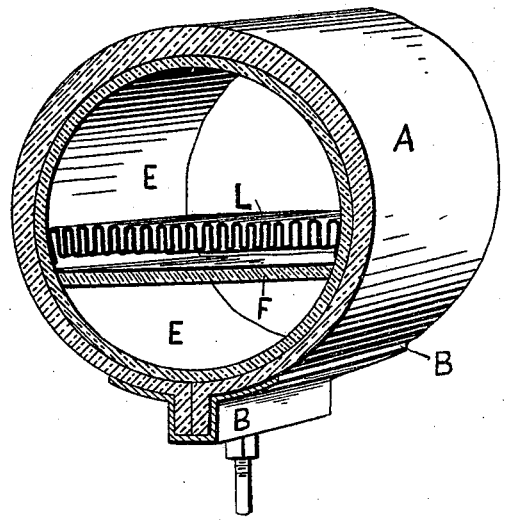

(No Model.)

G. F. WASHBURN.
BICYCLE TIRE.

No. 516,669. Patented Mar. 20, 1894.

WITNESSES.  
Charles Carlton  
E. G. Emanuel

INVENTOR.  
George F. Washburn,  
By Sylvenus S. Walker  
Attorney

UNITED STATES PATENT OFFICE.

GEORGE F. WASHBURN, OF BOSTON, MASSACHUSETTS.

BICYCLE-TIRE.

SPECIFICATION forming part of Letters Patent No. 516,669, dated March 20, 1894.

Application filed January 14, 1893. Serial No. 458,417. (No model.)

*To all whom it may concern:*

Be it known that I, GEORGE F. WASHBURN, of Boston, in the county of Suffolk and State of Massachusetts, have invented an Improvement in Bicycle-Wheels, of which the following is a specification.

My invention relates to pneumatic tires, and more especially to the inner tubes for inflating the pneumatic tires with air to increase the elasticity of the tires as heretofore and now in use.

The object of my invention is to provide means for renewing the inflation, in case the inner air tube is accidentally punctured when being driven, or when the bicycle is in actual use.

My invention consists in the construction, combination, and arrangement of the inner inflating tube, with two or more divisions, partitions, or means for forming two or more compartments extending throughout the length of the tube, whereby the air may be forced into one of the longitudinal compartments with greater pressure than the other, or others, so as to secure greater resilience to the tire, or wheel, than could be produced in case a single inner air tube were employed to form a pneumatic tire, as heretofore, and now in general use for the purpose.

My invention is hereinafter more fully described and specifically set forth in the claims.

Figure 2:
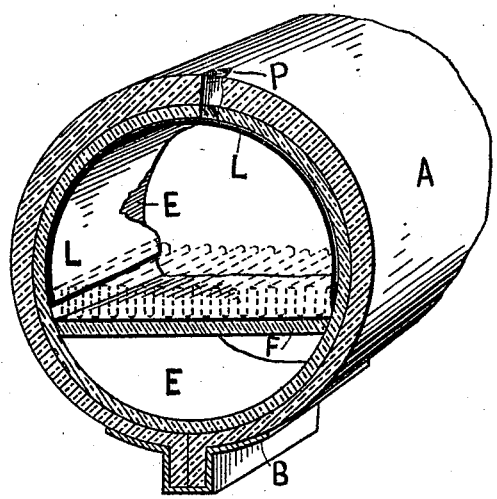

In the drawings hereto annexed which form a part of this specification, reference is made:

Figure 1 represents a sectional perspective view of a pneumatic tire for bicycles constructed in accordance with my invention. Fig. 2 represents a similar view of the same, as punctured, showing the device for closing the hole inflated into position therewith, by means of air being forced into a different compartment, provided for the purpose.

A represents a molded sheet rubber tire of the usual construction heretofore employed for the purpose, its opposite meeting edges being seated and inclosed within a channel or peripheral groove formed in the sheet steel rim B, of the wheel, as heretofore and now in use. Now in order that the wheel tire A, may be inflated with air, I provide an inner tube E, of elastic rubber, having a horizontal longitudinal partition F, united at its opposite edges, throughout, with the inner surface, or walls of the said inner tube E, at a point somewhat to one side of the center, or greatest diameter thereof, more, or less, as may be desired, to form an air compartment which may be filled with air under very great pressure, so as to remain unyielding under the usual weight of the person riding upon the wheel, provided with this style of pneumatic tire; it being understood that the main outside, or larger outward compartment, next the tread of the said tire A, is filled with air as usual, or after the said smaller inward compartment has been filled with air, as most convenient. Now if the tire and inner tube should accidentally become punctured when in use, as seen at P, Fig. 2, so as to disable the wheel, I have provided a thin flexible partition L, united at opposite edges (in like manner) to the interior of the said inner tube E, at a short distance, or quite near the said rigid, or thick partition F, and of such extra width, or fullness, that it may be inflated, or forced, by air introduced between the said thin partition L, and thick partition F, into contact with the said hole, or puncture P, in the said inner tube E, and consequently in contact with the inward surface of the tube E, throughout such portion, as to serve the same purpose as the said tube E, served previous to being punctured, as shown in Fig. 2 and as above described, forming a pneumatic tire.

I have omitted to show the separate filling tubes connected with each compartment, they being old and well known for the purpose, need not be further described, or illustrated.

The dotted lines shown in Fig. 2, represent the normal position of the said thin auxiliary partition L, shown in Fig. 1; before inflation, it may rest in contact with the said partition F.

Having thus described my invention, I claim—

An inner air tube of a pneumatic tire for wheels, provided with an inward longitudinal thick partition, and a thinner flexible partition intermediate the said thick partition and outward inflated air tube and adapted to be inflated into contact with the surface of the said air tube, substantially as described for the purpose set forth.

In witness whereof I have signed my name, in presence of two witnesses, January 5th, 1893.

GEORGE F. WASHBURN.

Witnesses:
SYLVENUS WALKER,
CHARLES CARLTON.